Oct. 17, 1944.     W. H. HARMAN, JR     2,360,493
ELECTRICAL STRAIN RESPONSIVE APPARATUS
Filed March 9, 1943

INVENTOR
WILLIAM H. HARMAN, JR.
BY
ATTORNEY

Patented Oct. 17, 1944

2,360,493

UNITED STATES PATENT OFFICE 2,360,493

ELECTRICAL STRAIN RESPONSIVE APPARATUS

William H. Harman, Jr., Ardmore, Pa., assignor to The Baldwin Locomotive Works, a corporation of Pennsylvania Application March 9, 1943, Serial No. 478,582

5 Claims. (Cl. 201—63)

This invention relates generally to strain gages and more particularly to a gage adapted for very small gage lengths.

The general type of gage disclosed herein employs a bonded wire filament of the general character disclosed in Simmons Patent No. 2,292,549, the wire filament being continuous and solid preferably .001 to .002 of an inch in diameter bonded by cement throughout its effective length to a member subject to strain. The cement transmits strain from the specimen to the filament to cause the filament resistance to change in a predetermined relation to its change of strain. The change of resistance of the filament is measured by any usual measuring circuit such for example as a Wheatstone bridge.

The gage length of gages of this type may be extremely short but this involves an extremely tedious operation of winding the filament back and forth between closely spaced points.

It is an object of my invention to provide an improved strain gage of the bonded filament type in which an extremely small gage length may be obtained in a simple and economical manner while still retaining a high degree of sensitivity, accuracy and dependability together with relative ease of application to a specimen so as to measure strain at a localized area thereof.

Other objects and advantages will be more apparent to those skilled in the art from the following description of the accompanying drawing in which.

Figure 2:
Fig. 2 is a plan view of my improved gage.
Figure 1:
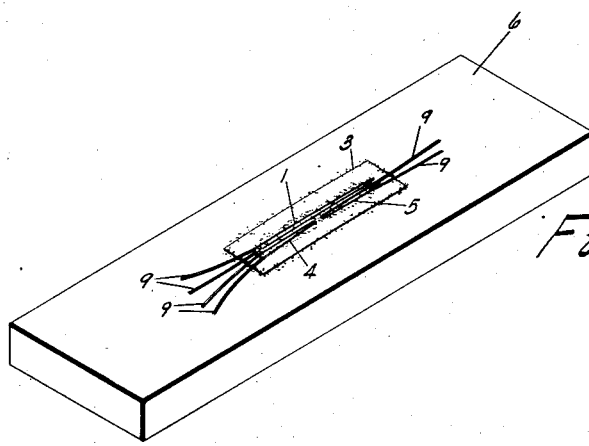
Fig. 1 is a perspective of my improved gage applied to a specimen.
Figure 3:
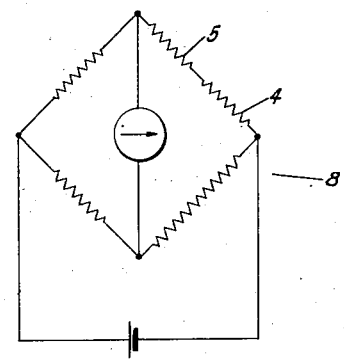
Fig. 3 is a wiring diagram of one form of measuring or indicating circuit adapted to be used with my improved gage.

In the particular embodiment of the invention, it will be understood that the structure of the gage, such as the character of filament material, filament sizes, method of bonding and bonding cements and all other physical and functional qualities are the same as those disclosed in said Simmons patent and hence these need not be repeated here. It will suffice to state that a metallic filament 1 of continuous solid material is preferably reversely bent into substantially parallel strands and bonded, throughout their effective length by cement shown by the speckled area 2, to a thin paper membrane 3. The number of strands of gage filament is determined by the resistance and sensitivity desired to be obtained. To obtain a short gage length but still avoid the necessity of winding a filament entirely within the short space as heretofore required, I employ a second gage structure having preferably two gage filaments 4 and 5 of the reversely wound type placed in side by side relation to filament 1 so as to be substantially parallel thereto but having their adjacent bent ends spaced apart by a distance L which determines the actual effective gage length of the complete gage unit. The filaments 4 and 5 preferably are of the same material, size and characteristics as the filament 1 of the first gage structure and are bonded throughout their length to membrane 3 in the same manner as filament 1 is bonded. The filaments 4 and 5 are specifically shown as having reversely extending parallel strands although a single strand might be employed or a multiplicity of parallel strands depending upon the amount of resistance desired.

It will of course be understood that the gage is applied to a specimen by first placing the bonding cement upon the cleaned surface of a specimen 6 and then pressing the membrane 3 down upon the cemented area and allowing the same to dry. However, the short gage length portion L is placed over the exact area to be studied. The remaining portion of the gage filaments will lie equally over the adjacent area of the test structure but will not influence the actual reading of the gage for the reason that these remaining portions of the two sets of gage filaments will be subject to strains of the same magnitude and thus cancel out each other when measured in a suitable bridge 8. Suitable leads commonly designated as 9 are secured to the ends of the various filaments so that the latter may be connected into the measuring circuit 8 to measure the change of resistance of the two sets of gages. To accomplish this, the change in resistance of filaments 4 and 5 in series could be measured in bridge 8 and the change in resistance of filament 1 could be simultaneously measured in another bridge similar to 8. The difference in resistance change of the two sets of gages represents the change of resistance of the short gage length L.

The principle thus involved in my improved arrangement is that two sets of gage structures are provided with one of the same of shorter length than the other whereby corresponding portions of the two gage structures cancel out each other and thereby permit the remaining uncancelled portion, as represented by the difference in lengths of the gages, to be the effective gage length. This principle allows the complete gage unit to be built with any desired effective gage length merely by spacing gage filaments 4 and 5 any desired distance apart. Under certain circumstances one of the second sets of gage filaments, such as 5, could be completely omitted thereby having the effective gage length extend from the reverse bend of filament 4 to the reverse bend of filament 1, it being understood that both reverse bends are at the right hand end of these particular filaments.

From the foregoing disclosure, it is seen that I have provided an extremely simple and effective gage of the bonded wire type whereby any desired short gage length may be obtained without the need of winding the wire entirely within this short gage length space. The gage itself, of course, broadly constitutes an electrical strain sensitive apparatus for application to a body adapted to be variably strained regardless of whether the strain sensitive unit is employed as a strain gage or simply as a medium to be responsive to a variable strain for whatever purpose it may be desired to use such variable gage resistance arising from the strain. It will also be understood that the filaments may be bonded directly to the specimen surface without any intermediate membrane such as 3. In this case the electrical insulating properties of the cement, whether it be "Duco Household" cement, "Glyptal," etc., will be sufficient to insulate the gage filament from the specimen if the latter is of a metallic character. The thin paper membrane 3 is inherently flexible so that the short effective gage length portion may be easily fitted and cemented to a sharply curved surface such as a fillet, etc. Broadly, the paper and cement in the case of a self-contained unitary gage structure constitute a supporting medium for the filaments while the cement alone is the supporting medium in the case of the filaments being bonded directly to the specimen.

It will of course be understood that various changes in details of construction and arrangement of parts may be made by those skilled in the art without departing from the spirit of the invention as set forth in the appended claims.

I claim:

1. An electrical strain gage unit adapted to measure deformations of a test body subject to variable strain comprising, a flexible membrane, a plurality of sets of filaments disposed in side by side relation to each other and bonded throughout their effective length to said membrane, said filaments being of electrical conducting material adapted to have their electrical resistance vary in accordance with their strain, and one set of said filaments being of shorter length than the other set whereby the difference in said lengths determines the effective gage length of the gage unit.

2. An electrical strain sensitive apparatus adapted to be applied to a body subject to a variable strain comprising, a plurality of sets of filaments of electrical conducting material whose resistance varies in response to change of strain, means for bonding said filaments throughout their effective length to said body, and said filaments being of unequal length and so positioned relative to each other so as to have corresponding portions adapted to be subject to substantially the same strain while the remaining portion of the filament of greater length determines the effective gage length that is adapted to be subject to strain in a localized area.

3. An electrical strain sensitive apparatus adapted to be applied to a body subject to a variable strain comprising a plurality of sets of filaments of electrical conducting material whose resistance varies in response to change of strain, said sets of filaments being positioned parallel to each other and the filaments of one set being of shorter length than the filament of another set whereby when all of said filaments are commonly bonded to a member subject to strain they are adapted to produce a differential resistance change corresponding to the difference in length of the sets of filaments.

4. An electrical strain sensitive apparatus for a body subject to variable strain comprising, a substantially straight filament, another substantially straight filament of shorter length than the first filament and positioned in close parallel relation to the first filament so that the filaments have corresponding similar portions adapted to cancel out each other while the remaining uncancelled portion of the longer filament is adapted to represent the effective gage length of the strain sensitive apparatus, said filaments, being of electrical conducting material whose electrical resistance varies in accordance with the strain of the filaments, and a support for said filaments adapted to be adhesively bonded to the body subject to strain and to said filament throughout its effective length whereby strains are transmitted from the body through the support to the filaments to cause relative changes of resistance therein.

5. An electrical strain sensitive apparatus for a body subject to variable strain comprising, a membrane, a substantially straight filament bonded throughout its effective length to said membrane, and a pair of filaments bonded throughout their effective length to said membrane and placed in close substantially parallel relation to the first filament and being disposed in end to end relation with their adjacent ends spaced apart a predetermined distance, the first filament having portions of its length corresponding substantially identically to said pair of filaments so that said corresponding portions are adapted to cancel out each other and thereby allow the first filament to have a remaining uncancelled portion equal to the distance between the adjacent ends of said pair of filaments.

WILLIAM H. HARMAN, Jr.